US012697634B2

(12) United States Patent
Pinard et al.

(10) Patent No.: US 12,697,634 B2
(45) Date of Patent: Aug. 4, 2026

(54) DEVICE FOR PACKAGING AND DISPENSING A PRODUCT WITH CHILD SAFETY

(71) Applicant: LABLABO, Juvigny (FR)

(72) Inventors: Thomas Pinard, Veyrier du Lac (FR); Patrice Puviland, Eteaux (FR); Adrien Moine, Larringes (FR)

(73) Assignee: LABLABO, Juvigny (FR)

( * ) Notice: Subject to any disclaimer, the term of this patent is extended or adjusted under 35 U.S.C. 154(b) by 560 days.

(21) Appl. No.: 17/919,489

(22) PCT Filed: Apr. 8, 2021

(86) PCT No.: PCT/FR2021/050620
§ 371 (c)(1),
(2) Date: Oct. 17, 2022

(87) PCT Pub. No.: WO2021/219946
PCT Pub. Date: Nov. 4, 2021

(65) Prior Publication Data

US 2023/0158529 A1 May 25, 2023

(30) Foreign Application Priority Data

Apr. 27, 2020 (FR) ...................................... 2004173

(51) Int. Cl.
*B05B 11/10* (2023.01)
*B65D 50/04* (2006.01)

(52) U.S. Cl.
CPC ...... *B05B 11/1059* (2023.01); *B05B 11/1047* (2023.01); *B65D 50/046* (2013.01)

(58) Field of Classification Search
CPC ............ B05B 11/1059; B05B 11/1047; B65D 50/046
See application file for complete search history.

(56) References Cited

U.S. PATENT DOCUMENTS 3,770,153 A * 11/1973 Gach .................... B65D 50/046 215/216
3,993,208 A * 11/1976 Ostrowsky ........... B65D 50/046 215/320
(Continued)

FOREIGN PATENT DOCUMENTS

CN 105 413 913 3/2016
CN 105413913 A 3/2016
(Continued)

OTHER PUBLICATIONS

Machine Translation of JP-2017197281-A.*
(Continued)

*Primary Examiner* — Jeremy Carroll
(74) *Attorney, Agent, or Firm* — IPSILON USA, LLP

(57) ABSTRACT

The invention relates to a product packaging and dispensing device (10) which comprises a container (12) containing the product to be dispensed; a sub-assembly attached to the container (12) and comprising a grooved neck (14), a pump (16) and a push member (18) actuating the pump (16) by manual pressure; and a closure cap (20) having a first ribbed cylindrical wall (200) engaging on the grooved neck (14), thus forming a bayonet-type connection system. The sub-assembly has an annular surface (140) provided with at least one lug (142). The cover (20) has a second wall (300) provided with at least one axial rib (304) abutting against the at least one lug (142) when the cover (20) is in a closed position, The second wall (300) has two diametrically opposed regions (306) that can be deformed by manual pressure so as to allow rotation of the cover (20) by releasing the at least one rib (304) from the at least one lug (142).

12 Claims, 2 Drawing Sheets

(56) References Cited

U.S. PATENT DOCUMENTS

| | | | | |
|---|---|---|---|---|
| 4,138,028 | A * | 2/1979 | Price | B65D 50/046 215/216 |
| 4,213,534 | A | 7/1980 | Montgomery | |
| 4,345,690 | A | 8/1982 | Hopley | |
| 4,351,442 | A * | 9/1982 | Summers | B65D 50/046 215/216 |
| 10,835,692 | B2 | 11/2020 | Szymiczek et al. | |
| 2004/0169000 | A1 | 9/2004 | Ramsey | |
| 2005/0072792 | A1 | 4/2005 | Harrold | |
| 2009/0255896 | A1* | 10/2009 | DeJonge | B65D 50/046 215/206 |
| 2010/0059518 | A1 | 3/2010 | Brozell et al. | |
| 2010/0096354 | A1* | 4/2010 | DeJonge | B65D 41/06 215/218 |
| 2016/0243319 | A1 | 8/2016 | Szymiczek et al. | |
| 2017/0144178 | A1* | 5/2017 | Deng | B05B 11/0032 |
| 2017/0206493 | A1 | 7/2017 | Adler et al. | |

FOREIGN PATENT DOCUMENTS

| | | | | |
|---|---|---|---|---|
| CN | 205366485 | U | 7/2016 | |
| EP | 3138599 | A1 * | 3/2017 | B05B 11/0032 |
| FR | 3032692 | A1 | 8/2016 | |
| GB | 823896 | A * | 9/1957 | |
| GB | 823 896 | | 11/1959 | |
| JP | S5618351 | U | 2/1981 | |
| JP | 2008302978 | | 12/2008 | |
| JP | 2017-197281 | | 11/2017 | |
| JP | 2017197281 | A * | 11/2017 | |
| SE | 529544 | C2 * | 9/2007 | B65D 41/06 |

OTHER PUBLICATIONS

Machine Translation of SE-529544-C2.*
Korean Search Report dated Dec. 20, 2023.
International Search Report dated Jan. 15, 2021.
Chinese Office Action dated May 31, 2025.
JP Office Action dated Oct. 8, 2024.

* cited by examiner

DEVICE FOR PACKAGING AND DISPENSING A PRODUCT WITH CHILD SAFETY

RELATED APPLICATION

This application is a National Phase of PCT/FR2021/050620 filed on Apr. 8, 2021, which claims the benefit of priority from French Patent Application No. 20 04173 filed on Apr. 27, 2020, the entirety of which are incorporated by reference.

FIELD OF THE INVENTION

The present invention relates to a product packaging and dispensing device which is safe for children.

The invention belongs to the field of childproof metering systems.

BACKGROUND

Numerous solutions have been proposed for fitting flasks, bottles and other containers with closure systems making it possible to restrict access to their contents by children and to ensure that adults can still access them.

However, most of the existing solutions are complex and costly to manufacture, are insufficiently robust, or do not meet the regulatory standards and provisions currently in force.

OBJECTS AND SUMMARY

The aim of the present invention is to remedy the aforementioned drawbacks of the prior art.

To that end, the present invention proposes a product packaging and dispensing device, having:

- a container having a base and an upper edge opposite to this base, the container containing the product to be dispensed;
- a subassembly that is fixed to the container and has a neck, a pump for dispensing the product, and a pushbutton that is able to slide in the neck and actuates the pump by manual pressure; and
- a closure cap having a first wall; the device being notable in that:
- the neck is provided with two slots, each having a first, flared part starting on an upper edge of the neck and a second, thin part extending over a finite length of the neck to form a bend with said first part, said first wall possessing two first ribs, each intended to be inserted into a slot in the neck to enable the cap to rotate from a closed position, for which the two first ribs are each locked in the base of the second, thin part, to an open position, for which said first ribs have reached the first, flared parts, and in that
- the subassembly has an annular surface that rests on the upper edge of the container and is provided with at least one lug, and the cap has a second cylindrical wall which has a diameter greater than the first wall and is concentric with respect to the first wall, the second wall having an inner face provided with at least one second axial rib which butts against the at least one lug when the cap is in a closed position; and
- the second wall has two diametrically opposed regions which are deformable by manual pressure so as to allow the cap to rotate by releasing the at least one second rib from said at least one lug.

The product packaging and dispensing device is thus fitted with a robust childproof locking system that has a very limited number of parts, is simple to manufacture and is inexpensive. This is because the packaging device combines a safety component by way of the cap, on which it is necessary to exert a certain pressure to enable it to rotate, and an opening component that performs well and is well controlled by the opening system of said cap, involving a bayonet-type system. It should be noted that the safety component implementing second ribs that butt against lugs is completely disassociated from the opening component involving the bayonet system. In this way, neither of these components influences the other component, ensuring proper operation of the product packaging and dispensing device according to the invention under any circumstances.

The cap is secured to the subassembly by means of a bayonet-type fixing system. When the cap is in the closed position, the second ribs are locked in the base of the second, thin parts of the slots and thus prevent any translational movement of the cap along its axis of revolution. When the cap is rotated from its closed position, the second ribs thus move toward the first, flared parts of the slots. Once they have reached said first parts, said ribs no longer serve as a stop, and there is nothing to retain the cap on the subassembly any more. The cap can then be removed from the subassembly effortlessly. The presence of two second ribs and two slots makes it possible to properly distribute the forces produced between the cap and the subassembly when said cap is being rotated around said subassembly. It should be noted that in the second, thin part of the slot each first rib slides along a longitudinal axis of said first rib, and in the first, flared part each first rib slides along an axis that is inclined with respect to a longitudinal axis of this first rib. Specifically, it is assumed that each first rib keeps the same spatial orientation in the second, thin part of the slot and in the first, flared part of said slot.

In one particular embodiment, the aforementioned annular surface is provided with two diametrically opposed lugs and the aforementioned inner face is provided with two second diametrically opposed axial ribs that respectively butt against the two lugs when the cap is in the closed position. This makes it possible to still further increase the safety of the locking of the device.

In one particular embodiment, the second wall has an outer face having a predetermined overthickness in the two deformable regions. This makes it possible for the user to easily identify the locations at which it is necessary to press on and rotate the cap in order to unlock it and open it.

According to one possible particular feature, this overthickness may have a plurality of grooves. This improves the ability to firmly grasp the cap while it is being pressed on and rotated, and this still further improves identification of the locations to be used for these manoeuvers simply by touch.

In one particular embodiment, the cap has instructions for opening the device. This promotes proper use of the device and this avoids having to provide a separate paper user manual for the device, which is not very practical.

According to one possible particular feature, these opening instructions may be etched onto the cap. This makes it possible to do away with printing in ink on a label and gluing this label to the cap.

According to one possible feature of the invention, the two slots in the neck are diametrically opposed such that the two first, flared parts are aligned along a diameter of the neck.

According to one possible feature of the invention, the two first ribs are diametrically opposed, each of the two first ribs having a profile in the shape of an arc of a circle extending along an imaginary circle embodying the periphery of the neck. The presence of two second ribs and two slots that are diametrically opposed makes it possible to properly distribute the forces when an inadvertent opening manoever is being performed.

According to one possible feature of the invention, the width of the second, thin part of each first rib is greater than the width of a first rib, the width of the first, flared part of each first rib being greater than the length of said first rib. More specifically, the width of the second, thin part is slightly greater than the width of the first rib, and so the first rib can slide along the second, thin part without generating any play. Similarly, the width of the first, flared part of the slot is slightly greater than the length of the first rib, and so, when the entirety of the first rib has reached the first, flared part of the slot, said first rib can immediately slide into said first, flared part.

The invention also relates to a method for using a product packaging and dispensing device according to the invention.

According to the invention, the method comprises the following steps, assuming the cap closes said device:

- a step of applying a manual pressure to the two deformable regions of the second wall of the cap, so as to release the second ribs from the two lugs,
- a step of rotating the cap which causes each first rib to slide in each slot, from the second, thin part to the first, flared part,
- a step of removing the cap from the subassembly when each first rib is located completely within the first, flared part of each slot.

BRIEF DESCRIPTION OF THE DRAWINGS

Further aspects and advantages of the invention will become more clearly apparent from reading the following detailed description of particular embodiments, which are given by way of entirely nonlimiting example and with reference to the appended drawings, in which.

DESCRIPTION OF EMBODIMENT(S)

Figure 1:
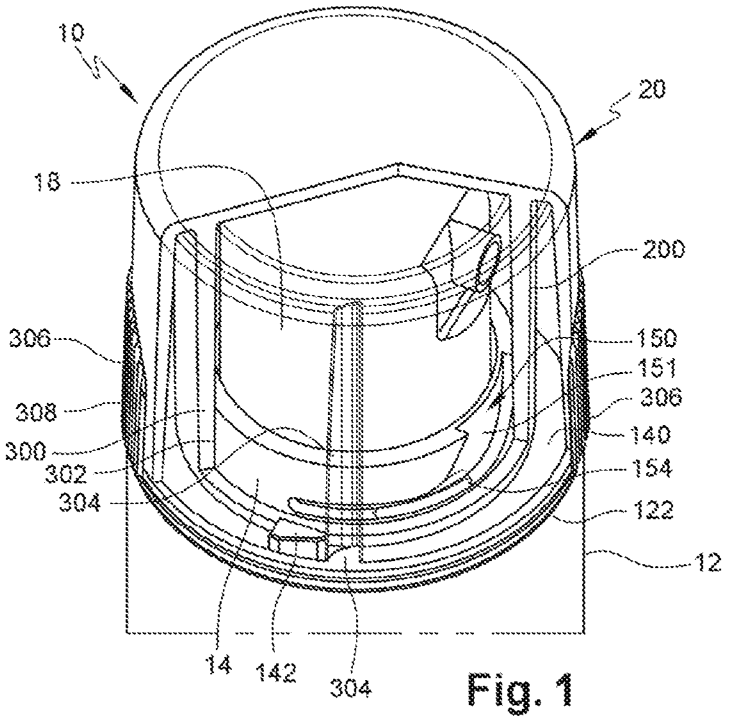
FIG. 1 is a schematic perspective view, partially showing hidden detail, of a device according to the present invention, in one particular embodiment.

As shown in FIG. 1, in one particular embodiment, a product packaging and dispensing device 10 according to the invention has a container 12, preferably cylindrical, which contains the product to be dispensed.

The product to be dispensed is, for example, a liquid, a paste or a gas. By way of entirely nonlimiting example, this may be a pharmaceutical, cosmetic, cleaning or dietary product.

The container 12 has a base 120 and an upper edge 122 at its end opposite to the base 120.

Figure 2:
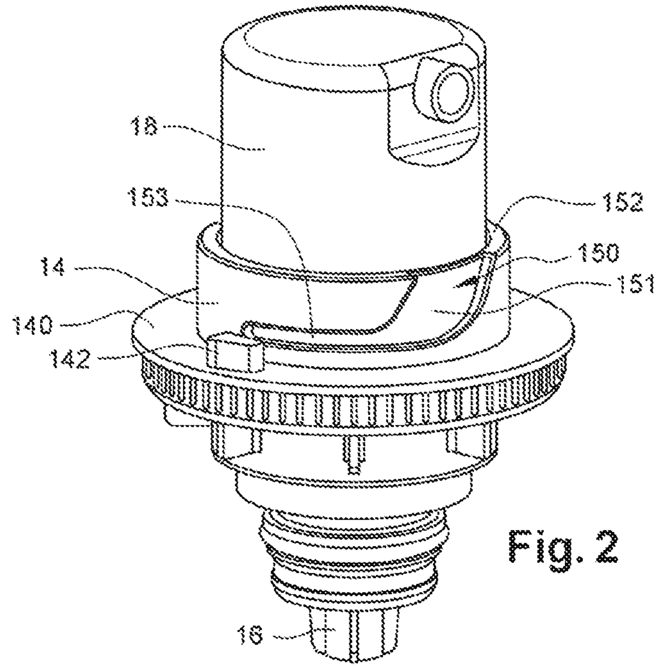
FIG. 2 is a schematic perspective view of a subassembly included in a device according to the present invention, in one particular embodiment.

With reference to FIG. 2, the device 10 also has a subassembly that is fixed to the container 12 and has a neck 14, a pump 16 for dispensing the product, and a pushbutton 18. The pushbutton 18 is able to slide in the neck 14 and actuates the pump 16 by manual pressure applied to the top of the pushbutton 18.

With reference to FIGS. 1 and 2, the neck 14 is a hollow cylindrical wall possessing two slots 150 each having a first, flared part 151 continued by a second, thin part 153. The first, flared part 151 starts on an upper edge 152 of the neck 14 and extends in the width of said neck 14 along an axis which is inclined with respect to the axis of revolution of this neck 14. Before it has completely passed through the neck 14, the first, flared part 151 continues by way of the second, thin part 153, which extends along an imaginary circle embodying the circumference of the neck 14. This second, thin part 153 has a profile in the shape of an arc of a circle prescribed by the curvature of the neck 14 and has a finite length in said neck 14. It should be specified that each slot 150 having the first, flared part 151 and the second, thin part 153 is blind, and that said two parts 151, 153 communicate with one another. This is because each slot 150 can be likened to a profiled recess which is made in the neck 14 and does not pass through said neck 14. The two slots 150 are disposed on the neck 14 in diametric opposition, that is to say that the centers of the two first, flared parts 151, considered along the upper edge 152 of the neck 14, are aligned along a diameter of the neck 14, and the two second, thin parts 153 extend from the same side with respect to said first, flared parts 151.

Figure 3:
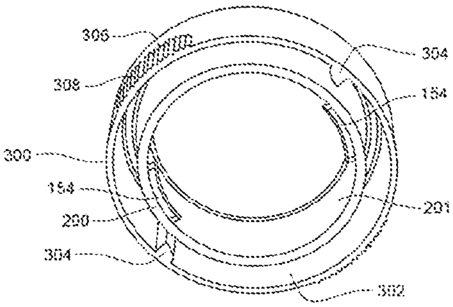
FIG. 3 is a schematic perspective view, partially showing the inside, of a cap included in a device according to the present invention, in one particular embodiment.
Figure 4:
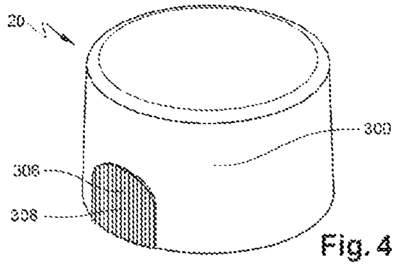
FIG. 4 is a schematic perspective view, partially showing the outside, of a cap included in a device according to the present invention, in one particular embodiment.

With reference to FIGS. 3 and 4, the device 10 moreover has a closure cap 20, which has a first cylindrical wall 200 having two first ribs 154. More specifically, this cylindrical wall 200 possesses an inner surface 201, from which the two first ribs 154 emerge. The two first ribs 154 extend along one and the same imaginary circle embodying the circumference of the first cylindrical wall 200 and are disposed on the first wall 200 in diametric opposition. Each first rib 154 thus has a profile in the shape of an arc of a circle prescribed by the curvature of the first wall 200 of the cap 20, and has a finite length. These first ribs 154 can thus be likened to projecting and inwardly curved bayonets. The width of the second, thin parts 153 of the slots 150 is greater than the width of the first ribs 154 and the width of the first, flared parts 151 of said slots is greater than the length of the first ribs 154. The cap 20 is placed on the subassembly such that each first rib 154 is inserted into a slot 150 in the neck 14. This cap 20 is mounted rotatably on the subassembly, such that it can be transferred from a closed position, for which the first ribs 154 are locked in the base of the second, thin parts 153 of the two slots 150, to an open position, for which said first ribs 154 have reached the first, flared parts 151 of said slots 150. The first ribs 154 slide in the second, thin parts 153 of the slots 150 without generating any play. Once the first ribs 154 have reached the first, flared parts 151 of the slots 150, the cap 20 can be removed from the subassembly in the direction along which each of said first, widened parts 151 extends. Specifically, the cap 20 is removed from the subassembly with retention of the spatial orientation of the first ribs 154, which is identical to that which they have in the second, thin parts 153 of the slots 150. In this way, the cap 20 is mounted on the subassembly by means of a bayonet-type system.

With reference to FIG. 2, the aforementioned subassembly has an annular surface 140 which rests on the upper edge 122 of the container 12.

In accordance with the invention, the annular surface 140 is provided with at least one lug 142 on its face opposite to that located inside the container 12.

Figure 5:
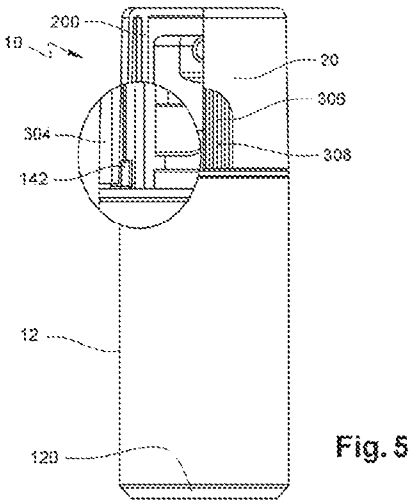
FIG. 5 is a schematic side view of a device according to the present invention, showing the positioning of the two ribs butting against the lugs.

With reference to FIGS. 1, 3 and 5, the cap 20 also has a second cylindrical wall 300 which has a diameter greater than the first wall 200 and is concentric with respect to the latter. The second wall 300 has an inner face 302, which can be seen in FIGS. 1 and 3, provided with at least one second axial rib 304, which can be seen in FIGS. 1 and 3. In the closed position of the cap 20, this second rib 304 butts against the lug 142, thus rotationally locking the device 10.

With reference to FIGS. 1, 2 and 5, in the embodiment under consideration, the annular surface 140 is provided with two diametrically opposed lugs 142 and the inner face 302 is provided with two second diametrically opposed axial ribs 304 that respectively butt against the two lugs 142 of the cap 20. However, it would be possible to provide more lug/second associated rib pairs. In these figures, only a single one of the two lugs 142 can be seen, the other lug 142 being hidden by the elements of the device 10.

With reference to FIGS. 1 and 4, the second wall 300 moreover has two diametrically opposed regions 306 which are deformable by manual pressure. These two regions 306 are located such that any straight line that passes through the axis of the cylinder of the walls 200 and 300, is orthogonal to this axis and passes through the second rib(s) 304 is orthogonal to any straight line that passes through the axis of this same cylinder and divides the two regions 306 into two sectors with the same surface area. In other words, the two regions 306 are positioned perpendicularly to the second ribs 304.

The locking manoeuver for the device 10 consists in exerting a manual pressure on these two regions 306 while still rotating the cap 20. Deformation of the second wall 300 causes the second ribs 304 to then move away from the axis of the aforementioned cylinder and, when the pressure exerted is sufficient, they move away enough to be able to be released from the lugs 142.

As shown in FIGS. 1 and 3, in one particular embodiment, the second wall 300 may have an outer face having a slight overthickness in the two deformable regions 306. This overthickness may have a plurality of grooves 308, which can be seen in FIGS. 1, 3 and 4.

As a variant, the two deformable regions 306 may have a particular etching or screen print or any other feature that makes it possible for the user to identify them so that they apply pressure to the correct place on the cap 20 in order to remove it.

The second wall 300 may be made of any material that has mechanical properties compatible with the elastic deformation necessary for the operation of the device 10.

As shown in FIGS. 1 and 4, in one particular embodiment, the cap 20 may incorporate instructions for opening the device 10. By way of entirely nonlimiting example, these instructions may be etched, or printed or appended by any other technique, onto the cap 20, for example onto the top of the cap 20, for example in the form, on the one hand, of two arrows directed toward one another and located above the two deformable regions 306, indicating that pressure should be applied to these two regions 306, and, on the other hand, of a rotary arrow indicating the direction of rotation for the opening and unlocking action.

In the examples of FIGS. 1 and 4, these illustrations are supplemented by the numeral "1" located between the two facing arrows and the numeral "2" located at the side of the rotary arrow. These numerals indicate the order of operations, specifically: press on the cap 20, then turn it.

A method for using a product packaging and dispensing device 10 according to the invention comprises the following steps, assuming the cap 20 closes said device 10:

- a step of applying a manual pressure to the two deformable regions 306 of the second wall 300 of the cap 20, so as to release the second ribs 304 from the two lugs 142,
- a step of rotating the cap 20 which causes each first rib 154 to slide in each slot 150, from the second, thin part 153 to the first, flared part 151,
- a step of removing the cap 20 from the subassembly when each first rib 154 is located completely within the first, flared part 151 of each slot 150.

The invention claimed is:

1. A product packaging and dispensing device comprising:

a container having a base and an upper edge opposite to said base, said container containing the product to be dispensed;

a subassembly that is fixed to said container and has a neck, a pump for dispensing the product, and a push-button that is able to slide in said neck and actuates said pump by manual pressure; and a closure cap having a first cylindrical wall, wherein an outer surface of the neck is provided with two slots, each slot having a first, flared part starting on an upper edge of the neck and a second, thin part extending over a finite length of the neck to form a bend with said first part, said first cylindrical wall possessing an inner surface from which two first ribs emerge, each first rib being intended to be inserted into a slot in the neck to enable the cap to rotate from a closed position, for which the two first ribs are each locked in the base of the second, thin part, to an open position, for which said first ribs have reached the first, flared parts, said subassembly has an annular surface that rests on said upper edge of said container, has a diameter greater than said neck, and is provided with at least one lug;

said cap has a second cylindrical wall which has a diameter greater than said first cylindrical wall and is concentric with respect to said first cylindrical wall, said second cylindrical wall having an inner face provided with at least one second axial rib which butts against said at least one lug when the cap is in a closed position; and said second cylindrical wall has two diametrically opposed regions which are deformable by manual pressure so as to allow said cap to rotate by releasing said at least one second rib from said at least one lug.

2. The device as claimed in claim 1, wherein said annular surface is provided with two diametrically opposed lugs and said inner face is provided with two second diametrically opposed axial ribs that respectively butt against said two lugs when the cap is in the closed position.

3. The device as claimed in claim 2, wherein the two deformable regions are located such that any straight line that passes through a cylinder axis of the first and second cylindrical walls, is orthogonal to said cylinder axis and passes through said two second ribs, is orthogonal to any straight line that passes through said cylinder axis and divides said two deformable regions into two sectors with the same surface area, whereby said two deformable regions are positioned perpendicularly to said two second ribs.

4. The device as claimed in claim 1, wherein said second cylindrical wall has an outer face having a bulge in said two deformable regions.

5. The device as claimed in claim 4, wherein said bulge has a plurality of grooves.

6. The device as claimed in claim 1, wherein said cap has instructions for opening said device.

7. The device as claimed in claim 6, wherein said opening instructions are etched onto said cap.

8. The device as claimed in claim 1, wherein the two slots in the neck are diametrically opposed such that the two first, flared parts are aligned along a diameter of the neck.

9. The device as claimed in claim 8, wherein the two first ribs are diametrically opposed, and wherein each of the two first ribs has a profile in the shape of a circular arc extending along an imaginary circle embodying the periphery of the neck.

10. The device as claimed in claim 9, wherein the width of the second, thin part of each slot is greater than the width of a first rib, and wherein the width of the first, flared part of each slot is greater than the length of said first rib.

11. The device as claimed in claim 8, wherein the width of the second, thin part of each slot is greater than the width of a first rib, and wherein the width of the first, flared part of each slot is greater than the length of said first rib.

12. A method for using a product packaging and dispensing device as claimed in claim 1, wherein said method comprises the following steps, assuming the cap closes said device:

a step of applying a manual pressure to the two deformable regions of the second cylindrical wall of the cap, so as to release the second ribs from the two lugs, a step of rotating the cap which causes each first rib to slide in each slot, from the second, thin part to the first, flared part, a step of removing the cap from the subassembly when each first rib is located completely within the first, flared part of each slot.

* * * * *